Patented Sept. 5, 1933

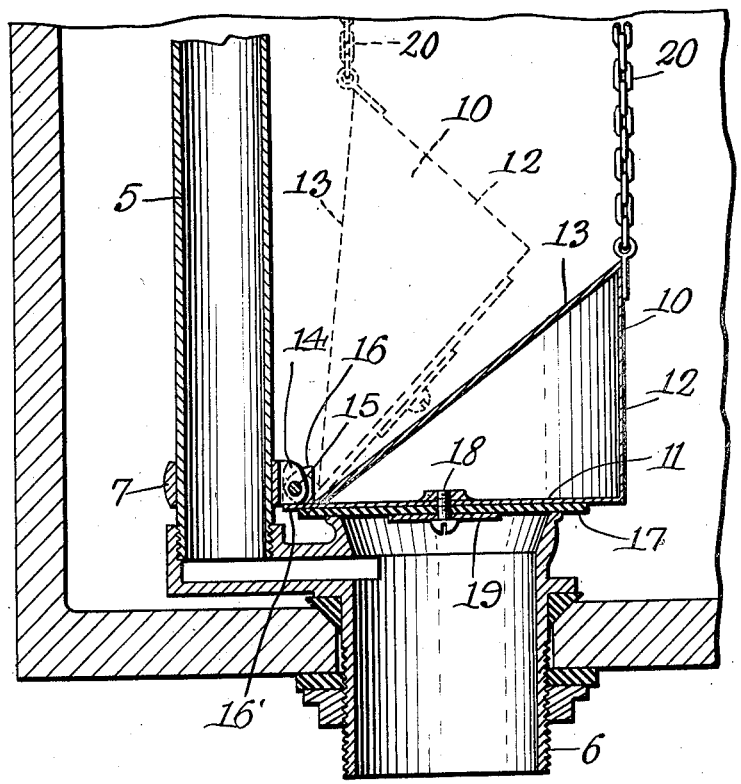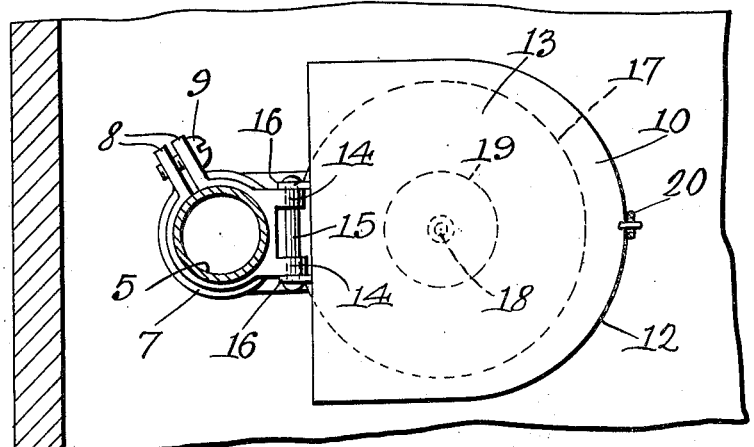

1,925,748

UNITED STATES PATENT OFFICE 1,925,748

FLUSH TANK VALVE

Lawrence L. Colvin, Louisville, Ky.

Application February 24, 1932. Serial No. 594,846

1 Claim. (Cl. 4—57)

This invention relates to valves, and more particularly to valves designed primarily for use in connection with toilet flush tanks.

An important object of the invention is to provide a valve which will embody but few parts, and one which may be readily and easily positioned on the overflow pipe of the usual flush tank, eliminating the necessity of making alterations in the tank construction, to install the valve.

Another important object of the invention, is to provide a valve which will be positive in operation, to insure the complete closing of the waste pipe of the tank, with each operation of the valve.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a vertical sectional view through a flush tank equipped with a valve constructed in accordance with the invention.

Figure 2 is a transverse sectional view through a tank, the valve being shown in plan.

Referring to the drawing in detail, the reference character 5 designates the overflow pipe of the flush tank of a toilet, and the reference character 6 designates the waste pipe.

As shown, the waste pipe extends above the bottom of the tank in which the waste pipe is positioned, where it provides a seat for the valve, forming the essence of this invention.

The valve comprises a split collar indicated by the reference character 7, the ends of the collar being extended at right angles providing ears 8, which are apertured to receive the bolt 9 for securing the collar in position on the overflow pipe.

The float, which forms the body portion of the valve, is indicated by the reference character 10, and as shown, the float is provided with a substantially straight lower wall 11, curved front wall 12 and an inclined upper wall 13, the inclined upper wall being provided so that the float may move an appreciable distance without contacting with the overflow pipe 5.

Spaced ears 14 are provided on the collar 7, which ears are formed with openings to receive the pivot pin 15 that also passes through ears 16, extending from one edge of the float.

These ears rise from the ends of the lip 16' that extends from the lower wall 11. This lip is engaged by the ears 14, and holds the float in a horizontal position while it is being positioned on the overflow pipe.

Thus it will be seen that due to this construction, free pivotal movement of the float with respect to the collar 7, will be permitted at all times.

The reference character 17 designates a disk-like washer formed preferably of rubber, the washer being of a diameter greater than the diameter of the open end of the waste pipe 6, so that when the float moves to its active position, the disk-like washer will rest on the open upper end of the waste pipe, cutting off the flow of water through the waste pipe and allowing the tank to fill.

A screw indicated at 18 passes through an opening formed centrally of the disk-like washer 17, and passes into a threaded opening formed in the lower wall of the float, to the end that it is an easy matter to remove or replace the disk-like washer 17, should the same become worn or otherwise rendered inoperative. A washer indicated at 19 is also provided for strengthening the connection between the washer and float.

An operating chain indicated by the reference character 20 is connected with the float near the outer upper edge thereof, which chain is connected to the usual operating lever of the tank.

From the foregoing it will be seen that due to the construction shown and described, I have provided a simple and inexpensive valve to be used in place of the usual ball valve of a flush tank, and one which may be readily and easily positioned without the necessity of making alterations in the usual flush tank construction.

Having thus described the invention what is claimed.

I claim:

The combination with the waste pipe and overflow pipe of a flush tank, of a valve comprising a float, a collar positioned around the overflow pipe, ears extending from the collar and to which the float is pivotally connected, a horizontally disposed lip extending from the float and adapted to engage the ears for holding the float in a horizontal position and in true alignment with the collar, when the float is being positioned, and a washer on the float and adapted to engage the overflow pipe controlling the flow of liquid through the waste pipe, and means for operating the float.

LAWRENCE L. COLVIN.